United States Patent
Cho et al.

(10) Patent No.: US 10,122,974 B2
(45) Date of Patent: Nov. 6, 2018

(54) APPARATUS AND METHOD FOR GENERATING ALARM

(71) Applicant: HANWHA TECHWIN CO., LTD., Changwon-si (KR)

(72) Inventors: Sung Bong Cho, Changwon-si (KR); Dooman Kim, Changwon-si (KR)

(73) Assignee: Hanwha Techwin Co., Ltd., Changwon-si (KR)

( * ) Notice: Subject to any disclaimer, the term of this patent is extended or adjusted under 35 U.S.C. 154(b) by 290 days.

(21) Appl. No.: 14/886,202

(22) Filed: Oct. 19, 2015

(65) Prior Publication Data

US 2016/0110973 A1 Apr. 21, 2016

(30) Foreign Application Priority Data

Oct. 20, 2014 (KR) .................. 10-2014-0141812

(51) Int. Cl.
| | |
|---|---|
| *H04N 7/18* | (2006.01) |
| *A01M 29/00* | (2011.01) |
| *G08B 7/06* | (2006.01) |
| *G08B 13/196* | (2006.01) |

(52) U.S. Cl.
CPC .............. *H04N 7/18* (2013.01); *A01M 29/00* (2013.01); *G08B 7/06* (2013.01); *G08B 13/19606* (2013.01)

(58) Field of Classification Search
CPC ........... H04N 7/18; A01M 29/00; G08B 7/06; G08B 13/19606
USPC ....................................................... 348/143
See application file for complete search history.

(56) References Cited

U.S. PATENT DOCUMENTS

| | | | | |
|---|---|---|---|---|
| 2011/0144829 | A1* | 6/2011 | Kim ...................... | A01M 29/10 701/2 |
| 2014/0148978 | A1* | 5/2014 | Duncan ................ | A01M 29/10 701/3 |
| 2016/0063310 | A1* | 3/2016 | Okamoto ........... | G06K 9/00362 348/143 |

FOREIGN PATENT DOCUMENTS

| | | |
|---|---|---|
| CN | 203087382 U | 7/2013 |
| CN | 103704196 A | 4/2014 |
| JP | 2003-219399 A | 7/2003 |
| JP | 5577398 B2 | 8/2014 |
| KR | 10-2005-0075875 A | 7/2005 |
| KR | 10-2008-0096110 A | 10/2008 |
| KR | 10-2010-0084787 A | 7/2010 |
| KR | 10-2012-0131457 A | 12/2012 |
| KR | 10-2013-0023526 A | 3/2013 |

OTHER PUBLICATIONS

Communication dated Jun. 5, 2017, issued by the State Intellectual Property Office of the People's Republic of China in counterpart Chinese Patent Application No. 201510681363.0.

* cited by examiner

*Primary Examiner* — Jamie J Atala
*Assistant Examiner* — Ayman A Abaza
(74) *Attorney, Agent, or Firm* — Sughrue Mion, PLLC

(57) ABSTRACT

An apparatus and a method for generating an alarm are provided. The apparatus includes at least one processor configured to implement: a determination unit analyzing at least one of an image, which includes an object, and a sound related to the object, and, as a result of the analysis, determining a type of the object; and an alarm generation unit controlling an alarm generator to generate an alarm according to a result of the determination performed by the determination unit.

20 Claims, 7 Drawing Sheets

APPARATUS AND METHOD FOR GENERATING ALARM

CROSS-REFERENCE TO THE RELATED APPLICATION

This application claims priority from Korean Patent Application No. 10-2014-0141812 filed on Oct. 20, 2014 in the Korean Intellectual Property Office, the disclosure of which is incorporated herein its entirety by reference.

BACKGROUND

1. Field

Apparatuses and methods consistent with exemplary embodiments relate to generating an alarm, and more particularly, to generating an alarm, which may indicate a type of an object (such as a person, an animal, an insect, a bird, or the like) appearing in a captured image and induce an action of the object.

2. Description of the Related Art

The closed circuit television (CCTV), which is a type of TV which transmits images to a designated recipient, and is called "closed circuit" because the transmission of the images transmitted in a either wired or wireless manner cannot be accessed by people other than designated recipients.

The CCTV often called industrial TV (ITV) has been widely used not only for TV broadcasting but also for various other purposes, such as industrial, educational, medical, and preventive purposes. The transmission of image data via CCTV involves a much larger amount of processing than the transmission of other types of data such as sound data and is advantageous in that even the mood and emotions of people on the spot where CCTV is installed can be sent.

A camera used in a CCTV system is generally called a CCTV camera. The CCTV camera converts an image input to the lens thereof into an electric signal using an image pickup device such as a charge-coupled device (CCD) or a complementary metal-oxide-semiconductor (CMOS) and transmits the electric signal to a display device such as a monitor in a wired or wireless manner.

A CCTV camera is generally installed at a fixed indoor or outdoor location and may be interfered with a human or animal or any other object or phenomenon. For example, the field of view of the CCTV camera may not be able to be sufficiently secured due to the presence of a human or animal such as bird or an insect in front of the lens of the CCTV camera, or there is also a risk that the angle of the CCTV camera may be physically changed, or the CCTV camera may even be damaged by a human or animal.

Therefore, an apparatus and a method are needed to secure a stable operation of a camera against such interference.

SUMMARY

Exemplary embodiments of the inventive concept provide an apparatus and method for determining a type of an object included in a captured image (whether it is a person, an animal or any other thing) and generating an alarm capable of inducing an action of the object.

However, the inventive concept is not restricted to those set forth herein. These and other exemplary embodiments of the inventive concept will become more apparent to one of ordinary skill in the art by referencing the detailed description given below.

According to an aspect of an exemplary embodiment, there is provided an apparatus for generating an alarm which may include at least one processor configured to implement: a determination unit analyzing at least one of an image, which includes an object, and a sound related to the object, and, as a result of the analysis, determining a type of the object; and an alarm generation unit controlling an alarm generator to generate an alarm according to a result of the determination performed by the determination unit.

According to another aspect of an exemplary embodiment, there is provided a method of generating an alarm which may include: receiving at least one of an image, which includes an object, and a sound related to the object; determining a type of the object by analyzing the at least one of the image and the sound; and controlling an alarm generator to generate an alarm according to a result of the determining.

According to the exemplary embodiments, it is possible to secure a stable operation of a camera against animals, insects, or the like by determining a type of an object included in a captured image (whether it is a person, an animal or any other things) and generating an alarm capable of inducing an action of the object Other features and exemplary embodiments will be apparent from the following detailed description, the drawings, and the claims.

BRIEF DESCRIPTION OF THE DRAWINGS

Exemplary embodiments of the inventive concept will be more clearly understood from the following detailed description taken in conjunction with the accompanying drawings, in which.

DETAILED DESCRIPTION OF THE EXEMPLARY EMBODIMENTS

Figure 1:
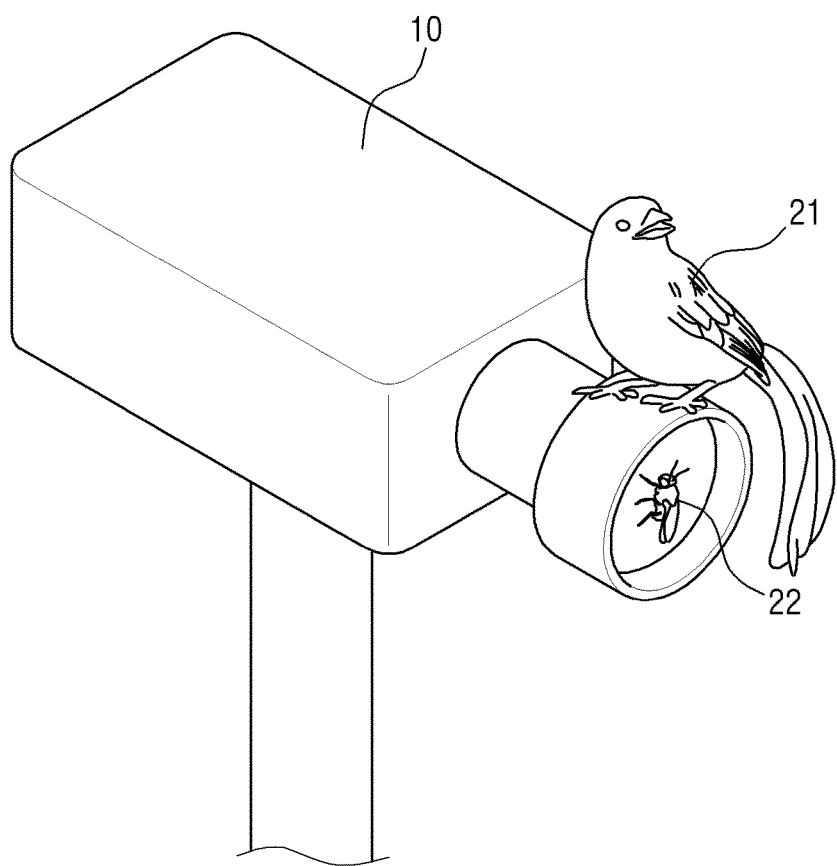
FIG. 1 is a schematic view illustrating a situation in which the field of view of a related camera is interfered with by an animal or an insect.

Advantages and features of the inventive concept may be understood by referring to the following detailed description of exemplary embodiments and the accompanying drawings. The inventive concept may, however, be embodied in many different forms and should not be construed as being limited to the embodiments set forth herein. Rather, these embodiments are provided so that this disclosure will be thorough and complete and will fully convey the inventive concept to those skilled in the art, and the inventive concept will only be defined by the appended claims. Like reference numerals refer to like elements throughout the specification.

Unless otherwise defined, all terms (including technical and scientific terms) used herein have the same meaning as commonly understood by one of ordinary skill in the art to which the exemplary embodiments belong. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

FIG. 1 is a schematic view illustrating a situation in which a field of view of a related art camera is interfered with by a human or animal.

A camera 10 may be installed and operated for surveillance or information gathering purposes, and an image capturing process of the camera 10 may be interfered with by various external factors.

More specifically, a field of view of the camera 10 may be interfered with by a human or animal such as a bird or insect. FIG. 1 illustrates a situation in which the camera 10 is interfered with a bird 21 and an insect 22.

Since it is difficult to determine behavioral patterns of living creatures, it is almost impossible to predict by what, when, and how the field of view of the camera 10 will be interfered with, and interference with the field of view of the camera 10, especially during gathering of critical information, may cause serious problems.

Thus, it may be preferable that a behavior of an interfering living creature be controlled so as to allow the camera 10 to perform its function properly. Accordingly, an apparatus 200 for generating an alarm according to an exemplary embodiment may either chase off an animal or insect that interferes with the field of view of the camera 10 or lure the animal or insect to a particular location by using the behavioral characteristics of the animal or insect.

Figure 2:
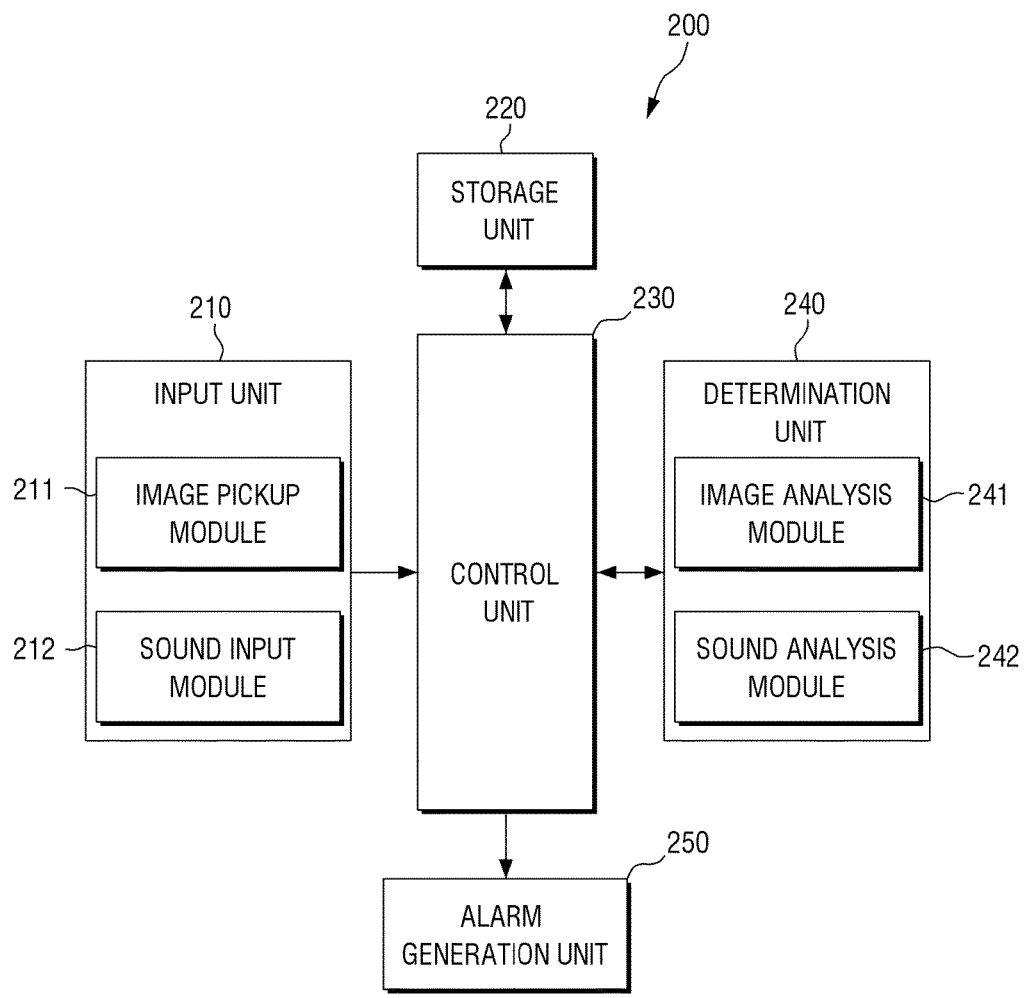
FIG. 2 is a block diagram of an apparatus for generating an alarm according to an exemplary embodiment.

FIG. 2 is a block diagram of an apparatus for generating an alarm according to an exemplary embodiment. Referring to FIG. 1, the apparatus 200 includes an input unit 210, a storage unit 220, a control unit 230, a determination unit 240, and an alarm generation unit 250.

The input unit 210 receives at least one of an image and a sound captured by the camera 10. For this, the input unit 210 may include an image pickup module 211 and a sound input module 212.

The image pickup module 211 captures an image.

The apparatus 200 may be embedded in, or attached to, the camera 10 as an element or component of the camera 10, or provided separately from the camera 10. The image pickup module 211 may include an image sensor (not illustrated) which receives light from an object and generates a digital image of the object.

The image sensor of the image pickup module 211 receives an analog image signal. To receive an image signal, an image pickup device may be included in the image sensor of the image pickup module 211. A charge-coupled device (CCD) or a complementary metal-oxide semiconductor (CMOS) may be used as the image pickup device.

The image sensor of the image pickup module 211 may control a gain of an input image signal, and thus, amplify the input image signal by a predetermined amount, thereby facilitating processing of the input image signal in subsequent processes. The image sensor of the image pickup module 211 may be equipped with a converter (not illustrated) which converts an amplified analog image signal into a digital image signal.

An image created by the image pickup module 211 may be a still image or a moving image.

The sound input module 212 receives a sound from surroundings of the camera 10, and may convert the received sound into an electric signal. That is, the sound input module 212 converts acoustic energy into electric energy, and a microphone may perform the functions of the sound input module 212.

The sound input module 212 may convert an audio signal into electric energy using an electrical resistance-type method, in which electrical resistance is changed using sound pressure, an piezoelectric-type method, in which a voltage is changed by using sound pressure according to a piezoelectric effect, a magnetic-type method, in which a voltage is generated according to variation of a thin metal foil and the voltage is converted into magnetic energy, a dynamic-type method, in which a movable coil arranged along a cylindrical magnet is driven as a diaphragm and a current generated in the coil is used, or a capacitive-type method, in which a diaphragm formed of a metal foil is placed to face a fixed magnet so as to form a condenser and capacitance of the condenser is allowed to change in response to the diaphragm being moved by a sound, and may thus convert the sound into an electrical signal.

The determination unit 240 analyzes and determines a type of an object included in the image provided by the input unit 210 or corresponding to a sound input to the input unit 210. The object may be a human or an animal such as an insect or bird. For example, the determination unit 240 may even determine whether the object is an adult or a child, or a dog or a cat.

The determination unit 240 includes an image analysis module 241 and a sound analysis module 242. The image analysis module 241 may determine the type of the object by analyzing the image captured by the image pickup module 211. As described above, the captured image may be a still image or a moving image, and the image analysis module 241 may determine the type of the object by comparing the still image with a plurality of still images stored in the storage unit 220, or by comparing a pattern of motion of the object in the moving image with a plurality of moving images stored in the storage unit 220.

In case that a plurality of objects are included in the captured image, the image analysis module 241 may separate each of the plurality of objects from the captured image, and may analyze and determine types of the separated objects individually.

The sound analysis module 242 analyzes a sound input to the sound input module 212, and may determine the type of the object. Sound made by various types of objects may be stored in the storage unit 220, and the sound analysis module 242 may determine the type of the object by comparing the input sound with a sound stored in the storage unit 220.

The input sound may be a unique sound of the object, or a sound made by the object in connection with a camera. For example, if the object is a bird, the input sound may be a cry of the bird, or a sound made when the bird grabs or scratches a lens of a camera with a claw.

The sound stored in the storage unit 220 may be a sound made purely by the object, and the sound analysis module 242 may remove noise from the sound input to the input unit 210 and may then perform a sound analysis.

If sounds of a plurality of objects are received, the sound analysis module 242 may analyze the received sounds to separate the sounds by object, and may analyze sound of each of the plurality of objects to determine the type of each of the plurality of objects.

The storage unit 220 stores images and sounds based on which the image analysis module 241 and the sound analysis module 242 can perform analysis. Here, the images and sounds are described as being stored in the storage unit 220 for analysis to determine a type of an object, these images and sounds may be corresponding image data and sound data. The shape of the object may vary depending on a direction in which the object is viewed, and the storage unit 220 may store data of a three-dimensional (3D) image or a plurality of images of the object. Accordingly, the image analysis module 241 may determine the type of the object by comparing an input image to the stored 3D image data or data of each of the plurality of images stored in the storage unit 220.

According to an exemplary embodiment, the storage unit 220 may be provided as being separate from the apparatus 200. In this embodiment, the apparatus 200 may further include a communication element or component (not illustrated) for communicating with the storage unit 220.

The alarm generation unit 250 generates an alarm according to results of determination performed by the determination unit 240. The alarm generation unit 250 may generate at least one of a visual alarm, an acoustic alarm, and a tactile alarm.

For example, the visual alarm may include laser, a hologram, visible light, infrared (IR) light, and ultraviolet (UV) light, the acoustic alarm may include a sound of a particular frequency and a sound of a particular animal, and the tactile alarm may include vibration and heat, and the alarm generation unit 250 may include at least one alarm generation element or component (not illustrated) capable of generating an alarm. This alarm generation element or component may be an element or component separate from the alarm generation unit 250 and generates an alarm at a command or instruction of the alarm generation unit 250.

Examples of an alarm generated by the apparatus 200 include a prevention alarm, which prevents the object from approaching, and an inducement alarm, which induces a motion of the object (such as moving to or away from a particular location or taking a particular action). More specifically, the prevention alarm may prevent the object from getting close to the apparatus 200, and the inducement alarm may move the object away to a particular location.

Even after the generation of the prevention alarm, the object may still appear in the captured image, or the sound may continue to be received. In this case, the determination unit 240 may determine the type of the object included in the captured image or corresponding to the input sound from among other types than the previously-determined type.

If the object still appear in the captured image or the input sound continues to be received even after the generation of the prevention alarm, it may mean that the previous determination of the object by the determination unit 240 is erroneous, so the determination unit 240 may determine the type of the object included in the captured image or corresponding to the input sound again to generate a proper alarm.

For example, if the object was previously identified as a sparrow, the determination unit 240 may determine the type of the object from among other types of birds than a sparrow.

The inducement alarm may induce the object to move to a particular location. For example, the inducement alarm may induce the object to get close to the apparatus 200. Alternatively, the inducement alarm may induce the object to a particular location away from the apparatus 200 or a predetermined target. Alternatively, the inducement alarm may induce the object to take a particular action.

The control unit 230 transmits a control signal to the alarm generation unit 250 so as for the alarm generation unit 250 to generate an alarm according to the results of determination performed by the determination unit 240. The prevention alarm, which may be generated according to the results of determination performed by the determination unit 240, may be a visual alarm that is particularly repellent to the object, such as a human or an animal, or a sound of a natural enemy of the object. On the other hand, the inducement alarm, which may also be generated according to the results of determination performed by the determination unit 240, a visual alarm that is appealing to the object or a sound of the same kind as the object. Alternatively, a visual effect, an audio effect, or a tactile effect capable of attracting attention of the object may serve functions of the inducement alarm.

The alarm generation unit 250 may generate only one alarm or a plurality of alarms according to the control signal provided by the control unit 230. For example, the alarm generation unit 250 may generate only one of a visual alarm, an audio alarm, and a tactile alarm, a plurality of visual alarms, a plurality of audio alarms, and a combination of a visual alarm, an audio alarm, and a tactile alarm.

For certain objects, no alarm needs to be generated. Thus, the control unit 230 may control the alarm generation unit 250 not to generate any alarm based on the results of determination performed by the determination unit 240. For example, if the apparatus 200 or a predetermined target is approached by an object that is allowed to access the apparatus 200 or the predetermined target, the control unit 230 may control the alarm generation unit 250 not to generate any alarm. When an alarm generation element or component is separately provided as describe above, the alarm generation unit 250 may control or instruct the alarm generation element or component not to generate any alarm at the control of the control unit 230.

The control unit 230 performs a general control of the input unit 210, the storage unit 220, the determination unit 240, and the alarm generation unit 250.

Figure 3:
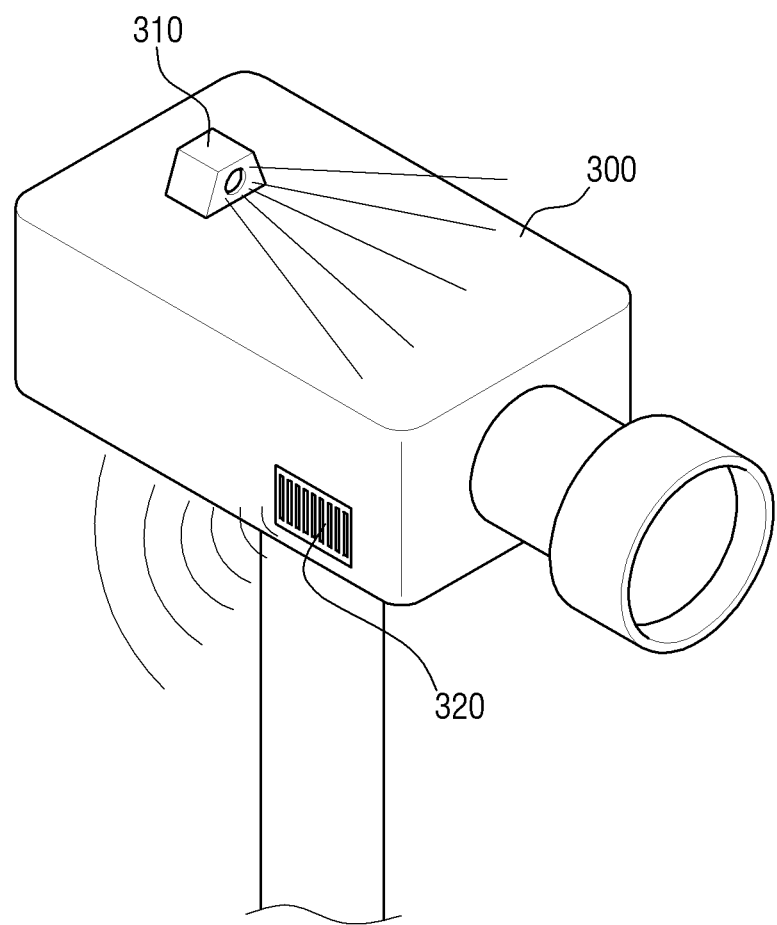
FIGS. 3 and 4 are schematic views of examples of a camera equipped with the apparatus for generating an alarm, according to exemplary embodiments.
Figure 4:
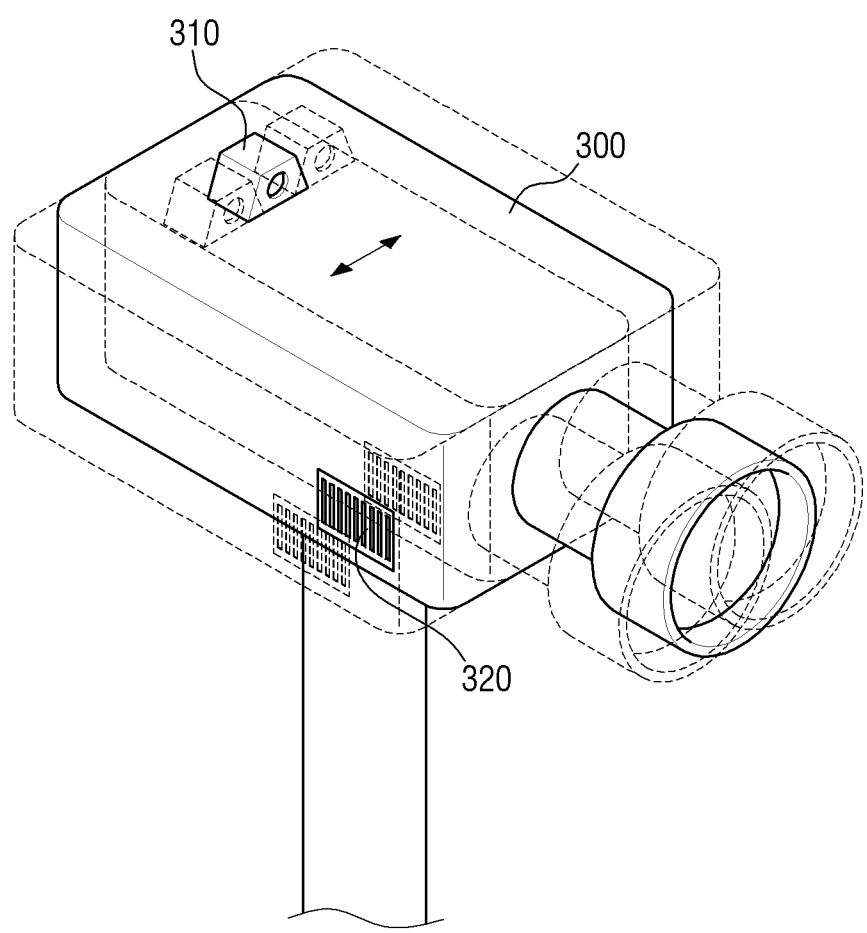

FIGS. 3 and 4 are schematic views of examples of a camera equipped with the apparatus for generating an alarm according to an exemplary embodiment. More specifically, FIG. 3 illustrates a camera 300 equipped with a visual alarm generation unit 310 and an audio alarm generation unit 320 as examples of the alarm generation unit 250, and FIG. 4 illustrates a camera 300 equipped with a tactile alarm generation unit (not illustrated) as an example of the alarm generation unit 250.

The term "visual alarm", as used herein, encompasses laser, visible light, IR light, and UV light, and the visual alarm generation unit 310 may generate laser, visible light, IR light, or UV light.

FIG. 3 illustrates that the camera 300 has only one visual alarm generation unit 310, but a plurality of visual alarm generation units 310 may be provided at different parts of the camera 300, in which case, the plurality of visual alarm generation units 310 may generate visual alarms of the same type or of different types. According to an exemplary embodiment, only one visual alarm generation unit 310 may generate different types of visual alarm.

The term "audio alarm", as used herein, encompasses a sound of a particular frequency and a sound of a particular animal, and the audio alarm generation unit 320 may output a sound of a particular frequency or a sound of a particular animal. That is, the audio alarm generation unit 320 converts an electric signal including audio information into vibration of a diaphragm, and generates a wave of condensation in the air so as to copy a sound wave. A speaker may perform the functions of the audio alarm generation unit 320.

The audio alarm generation unit 320 may convert an electric signal into a sound wave using a dynamic-, electromagnetic-, electrostatic-, dielectric-, or magnetic distortion-type method as described above.

FIG. 3 illustrates that the camera 300 includes only one audio alarm generation unit 320, but a plurality of audio alarm generation units 320 may be provided at different parts of the camera 300, in which case, the plurality of audio alarm generation units 320 may generate audio alarms of the same type or of different types. According to an exemplary embodiment, only one audio alarm generation unit 310 may generate different types of audio alarm.

The term "tactile alarm", as used herein, encompasses vibration and heat, and the tactile alarm generation unit may vibrate the camera 300 or generate heat on the outside of the camera 300.

To generate vibration, the tactile alarm generation unit may be equipped with one or more motors, and may generate vibration at different intensities or in different patterns according to the type of the object. FIG. 4 illustrates that the camera 300 generates vibration in a linear direction, but the inventive concept is not limited thereto. That is, the tactile alarm generation unit may generate vibration in various directions.

To generate heat, the tactile alarm generation unit may be equipped with a heat generating element or component, and may generate heat of different temperatures depending on the type of the object.

Figure 5:
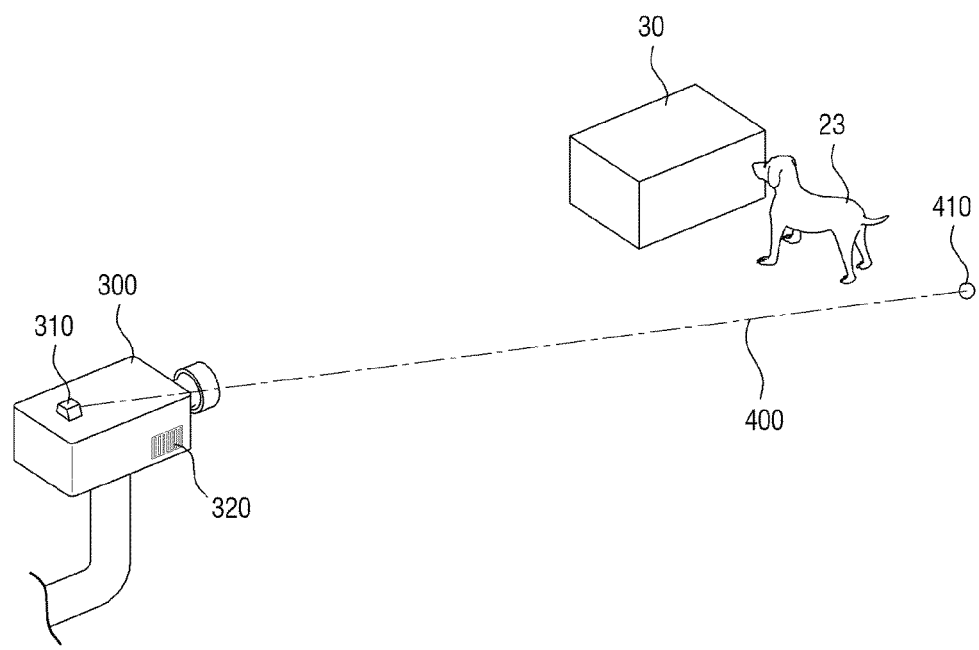
FIG. 5 is a schematic view illustrating how to induce an object, according to an exemplary embodiment.

FIG. 5 is a schematic view illustrating how to induce an object, according to an exemplary embodiment.

A camera 300 equipped with the apparatus 200 may continue to capture an image of a target 30. The target 30 may be a thing that is to be protected from an object 23, such as a person or an animal, or is dangerous to the object 23. Alternatively, the target 30 may be a signpost. Thus, it is preferable to prevent the object 23 from approaching the target 30.

If the object 23 approaches the target 30, the alarm generation unit 250 may generate an inducement alarm to induce the motion of the object 23 (such as moving to or away from a particular location or taking a particular action). A determination may be made by the image analysis module 241 as to whether the object 23 is approaching the target 30. The image analysis module 241 may determine whether the object 23 is approaching the target 30 based on a distance between the object 23 and the target 30 by analyzing an image captured by the image pickup module 211.

If the object 23 approaches the target 30, a manager may be notified. A notification message indicating that the object 23 is approaching the target 30 may be transmitted via a communication network such as an Ethernet, a public switched telephone network (PSTN), a mobile communication network, a wireless local area network (WLAN), or Bluetooth.

The notification message may be implemented as a text message, a still image, or a moving image, and an additional communication element or component (not illustrated) may be further provided in the apparatus 200 to transmit the notification message.

To generate an inducement alarm, the visual alarm generation unit 310 may irradiate laser 400 or output audio to attract the attention of the object 23.

The visual alarm generation unit 310 may change an illumination direction of the laser 400. That is, in response to the object 23 approaching the target 30, the visual alarm generation unit 310 may illuminate the laser 400 to, or near, the target 30 and then switch the irradiation direction of the laser 400 to a particular location. As a result, the object 23 may move away from the target 30 to the particular location, following a point 410 of illumination of the laser 400.

The visual alarm generation unit 310 may form the illumination point 410 at a place where an inducement element or component (not illustrated) is located by switching the illumination direction of the laser 400. In response to the object 23 triggering the inducement element or component, the visual alarm generation unit 310 may control the illumination of the laser 400. For example, the inducement element or component may be in the form of a button. Accordingly, in response to the object 23 pressing the button, the visual alarm generation unit 310 may form the illumination point 410 at a place where another inducement component or element (not illustrated) is located or may stop illuminating the laser 400.

Figure 6:
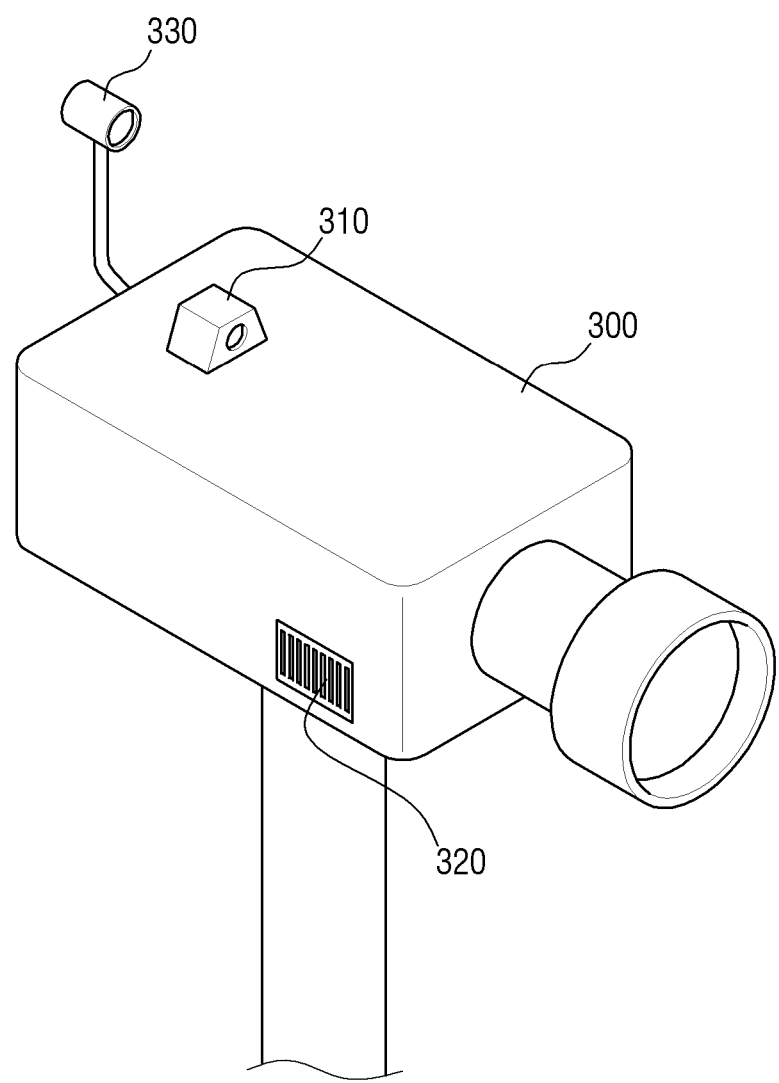
FIG. 6 is a schematic view of another example of the camera which further includes an additional image pickup portion, according to an exemplary embodiment.

FIG. 6 is a schematic view of another example of the camera 300, which further includes an additional image pickup module.

The determination unit 240 may not be able to properly determine a type of an object if a captured image, provided by the image pickup module 211, does not provide sufficient information to determine the type of the object.

For example, in response to the bird 21 sitting on the lens of the camera 10, as illustrated in FIG. 1, to block the field of view of the image pickup module 211 with its tail, the determination unit 240 may not be able to determine the type of the bird 21 because only the image of the tail of the bird 21 may be captured.

For this, the apparatus 200 may further include an additional image pickup module 330. The additional image pickup module 330 may be disposed at the rear of the camera 300 and may capture an image of surroundings of the lens of the camera 300. The additional image pickup module 330 may be helpful to determine the type of an object located near the lens of the camera 300.

The determination unit 240 may determine a type of an object based on at least one of an image captured by the image pickup module 211 and an image captured by the additional pickup module 330. In response to a determination being made that an object captured by the image pickup module 211 differs from an object captured by the additional image pickup module 330, the determination unit 240 may determine each of the object captured by the image pickup module 211 and the object captured by the additional image pickup unit 330.

Figure 7:
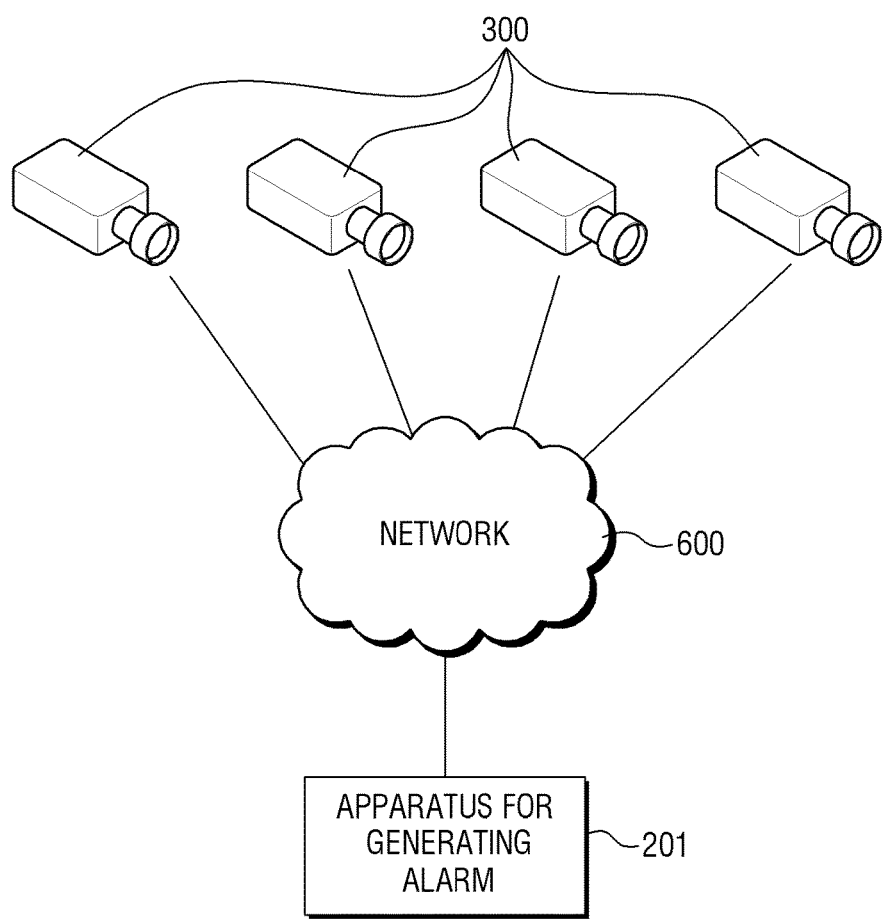
FIG. 7 is a schematic view illustrating an apparatus for generating an alarm connected to cameras via a network, according to an exemplary embodiment.

FIG. 7 is a schematic view illustrating an apparatus for generating an alarm according to another exemplary embodiment, connected to cameras via a network.

An apparatus 201 for generating an alarm according to another exemplary embodiment may be provided as being separate from cameras 300, instead of being embedded in or attached to each of the cameras 300, and may be connected to the cameras 300 via a network 600. For this, the cameras 300 and the apparatus 201 may both be equipped with a communication element or component (not illustrated) capable of accessing the network 600.

The input unit 210 and the alarm generation unit 250 may be provided in each of the cameras 300, and the storage unit 220, the control unit 230, and the determination unit 240 may be provided in the apparatus 201.

The network 600 may be implemented as a wired or wireless network, and may be a communication network such as an Ethernet, a PSTN, a WLAN, Bluetooth, or Wireless Broadband (WiBro).

When the apparatus 201 is connected to the cameras 300 via the network 600, the apparatus 201 may control generation of an alarm using the cameras 300. That is, the apparatus 201 may determine types of objects captured by the cameras 300 based on images or sounds received from the cameras 300 and may respectively transmit control signals corresponding to the determined types of the objects to the cameras 300.

At least one of the control unit 230, the alarm generation unit 250, and the determination unit 240 in FIG. 2 may be embodied as a various number of hardware, software and/or firmware structures that execute respective functions described above, according to an exemplary embodiment. For example, at least one of these units may use a direct circuit structure, such as a memory, processing, logic, a look-up table, etc. that may execute the respective functions through controls of one or more microprocessors or other control apparatuses. Also, at least one of these units may be specifically embodied by a module, a program, or a part of code, which contains one or more executable instructions for performing specified logic functions, and executed by one or more microprocessors or other control apparatuses. Also, at least one of these units may further include a processor such as a central processing unit (CPU) that performs the respective functions, a microprocessor, or the like. Two or more of these units may be combined into one single component, element or unit which performs all operations or functions of the combined two or more units. Also, at least part of functions of at least one of these units may be performed by another of these units. Further, although a bus is not illustrated in the above block diagrams, communication between the units may be performed through the bus. Functional aspects of the above exemplary embodiments may be implemented in algorithms that execute on one or more processors. Furthermore, the units represented by a block or processing steps may employ any number of related art techniques for electronics configuration, signal processing and/or control, data processing and the like.

The operations or steps of the methods or algorithms described above can be embodied as computer readable codes on a computer readable recording medium, or to be transmitted through a transmission medium. The computer readable recording medium is any data storage device that can store data which can be thereafter read by a computer system. Examples of the computer readable recording medium include read-only memory (ROM), random-access memory (RAM), compact disc (CD)-ROM, digital versatile disc (DVD), magnetic tape, floppy disk, and optical data storage device, not being limited thereto. The transmission medium can include carrier waves transmitted through the Internet or various types of communication channel. The computer readable recording medium can also be distributed over network coupled computer systems so that the computer readable code is stored and executed in a distributed fashion.

The exemplary embodiments of the inventive concept have been described with reference to the accompanying drawings. However, those skilled in the art will appreciate that many variations and modifications can be made to the disclosed embodiments without substantially departing from the principles of the inventive concept. Therefore, the disclosed embodiments of the inventive concept are used in a generic and descriptive sense only and not for purposes of limitation.

What is claimed is:

1. An apparatus for generating an alarm comprising at least one hardware processor configured to execute instructions to:

analyze at least one of a current image, which includes an object, and a sound related to the object, the current image and the sound being captured by a camera;

determine a type of the object in response to the analysis; and control an alarm generator to generate an alarm according to a result of the determination, the alarm comprising a prevention alarm configured to prevent the object from approaching, wherein the processor is configured to determine, after the prevention alarm is generated, whether the object is included in a next image captured by the camera after the current image, and in response to determining that the object is included in the next image, determine a type of the object included in the next image as being different from the type determined from the current image, wherein the processor is configured to control the alarm generator to generate a tactile alarm, wherein the tactile alarm comprises vibration at different intensities or in different patterns according to the type of the object, and heat of different temperatures depending on the type of the object, and wherein the apparatus further comprises at least one additional camera located to capture the object near a lens of the camera.

2. The apparatus of claim 1, wherein the processor is further configured to control the alarm generator to generate at least one of a visual alarm and an audio alarm.

3. The apparatus of claim 2, wherein the visual alarm comprises at least one of laser, visible light, infrared (IR) light, and ultraviolet (UV) light, and wherein the audio alarm comprises at least one of a sound of a particular frequency and a sound of a particular animal.

4. The apparatus of claim 1, wherein the alarm comprises an inducement alarm which is configured to induce an action of the object.

5. The apparatus of claim 4, wherein the processor is configured to determine whether the sound continues to be received after the prevention alarm is generated, and, wherein, in response to determining that the sound continues to be received after the prevention alarm is generated, the processor is configured to determine a type of the object as being different from the type determined from the current image.

6. The apparatus of claim 4, wherein the inducement alarm comprises an alarm which is configured to move the object to a particular location.

7. The apparatus of claim 1, wherein the processor is configured to:

generate the alarm in response to the apparatus or a predefined target being approached by the object; and not generate the alarm in response to the apparatus or a predefined target being approached by an authorized object which is authorized to access the apparatus or the predefined target.

8. The apparatus of claim 7, further comprising a communication interface configured to send a notification message in response to the predefined target being approached by the object.

9. The apparatus of claim 1, wherein the processor is configured to control the alarm generator to illuminate laser, and to change a direction of the illumination of the laser to a predetermined location based on a predetermined action by the object.

10. The apparatus of claim 1, further comprising:
an image pickup module configured to capture an image; and
an additional image pickup module configured to capture an image of a predetermined area surrounding a lens of the image pickup module.

11. The apparatus of claim 10, wherein the processor is further configured to determine a type of an object in the image of the predetermined area surrounding the lens of the image pickup module.

12. A method of generating an alarm executed by at least one hardware processor, the method comprising:
receiving at least one of a current image, which comprises an object, and a sound related to the object, the current image and the sound being captured by a camera;
determining a type of the object by analyzing the at least one from among the current image and the sound received;
controlling an alarm generator to generate an alarm according to a result of the determination, the alarm comprising a prevention alarm configured to prevent the object from approaching;
determining, after the prevention alarm is generated, whether the object is included in a next image captured by the camera after the current image; and
determining a type of the object included in the next image as being different from the type determined from the current image
wherein the alarm comprises a tactile alarm,
wherein the tactile alarm comprises vibration at different intensities or in different patterns according to the type of the object, and heat of different temperatures according to the type of the object, and
wherein the object is captured by an additional camera located to capture the object near a lens of the camera.

13. The method of claim 12, wherein the alarm further comprises at least one of a visual alarm and an audio alarm.

14. The method of claim 12, wherein the alarm comprises an inducement alarm which is configured to induce an action of the object.

15. The method of claim 14, further comprising:
determining whether the sound continues to be received after the prevention alarm is generated;
in response to determining that the sound continues to be received after the prevention alarm is generated, determining a type of the object as being different from the type determined from the current image.

16. The method of claim 14, wherein the inducement alarm comprises an alarm which is configured to move the object to a particular location.

17. The method of claim 12, further comprising:
controlling alarm to be generated in response to an apparatus for generating the alarm or a predefined target being approached by the object; and
controlling no alarm to be generated in response to the apparatus for generating the alarm or a predefined target being approached by an authorized object which is authorized to access the apparatus or the predefined target.

18. The method of claim 17, further comprising sending a notification message in response to the predefined target being approached by the object.

19. The method of claim 12, further comprising:
controlling the alarm generator to illuminate laser; and
controlling the alarm generator to change a direction of the illumination of the laser to a predetermined location based on a predetermined action by the object.

20. The method of claim 12, further comprising:
capturing an image of surroundings of the lens of the camera which captured the current image; and
determining a type of an object in the image of a predetermined area surrounding the lens of the camera.

* * * * *